United States Patent
Lopez, Jr. et al.

(10) Patent No.: US 10,639,663 B2
(45) Date of Patent: *May 5, 2020

(54) MASKING DEVICE

(71) Applicant: Engineered Products and Services, Inc., Franksville, WI (US)

(72) Inventors: Mario Lopez, Jr., Mt. Pleasant, WI (US); Chad M. Cushman, Racine, WI (US); Kissak Sarajian, Hartland, WI (US)

(73) Assignee: ENGINEERED PRODUCTS AND SERVICES, INC., Franksville, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,299

(22) Filed: Jan. 9, 2019

(65) Prior Publication Data

US 2019/0143357 A1 May 16, 2019

Related U.S. Application Data

(63) Continuation of application No. 15/668,374, filed on Aug. 3, 2017, now Pat. No. 10,189,043, which is a
(Continued)

(51) Int. Cl.
*B05B 12/24* (2018.01)
*C09J 7/29* (2018.01)
(Continued)

(52) U.S. Cl.
CPC .............. *B05B 12/24* (2018.02); *B05B 12/20* (2018.02); *B05D 1/325* (2013.01); *C09J 7/29* (2018.01);
(Continued)

(58) Field of Classification Search
CPC .......... Y10T 428/14; Y10T 428/24174; Y10T 428/1476; B05B 12/24; B05B 12/20; B05D 1/325

See application file for complete search history.

(56) References Cited

U.S. PATENT DOCUMENTS

| 3,386,846 A | 6/1968 | Lones |
| 4,454,180 A | 6/1984 | La Mers |

(Continued)

FOREIGN PATENT DOCUMENTS

| CA | 2075631 | 11/1992 |
| EP | 0506915 | 7/1992 |

(Continued)

OTHER PUBLICATIONS

International Search Report and Written Opinion for Application No. PCT/US2017/056345 dated Jan. 19, 2018, 17 pages.

*Primary Examiner* — Alexander S Thomas
(74) *Attorney, Agent, or Firm* — Michael Best & Friedrich LLP

(57) ABSTRACT

A masking device for covering a masking area includes a first member having a first tab portion and a first base portion. The masking device also includes a second member having a second tab portion and a second base portion. A pull tab of the masking device includes the first tab portion coupled to the second tab portion. The masking device further includes a third member having a member connection surface and a masking connection surface. The member connection surface is opposite the masking connection surface. A base of the masking device includes the first base portion, the second base portion, and the third member. A first adhesive couples the member connection surface of the third member to the first base portion and to the second base
(Continued)

portion. The masking connection surface of the third member is made to removably attach to the masking area.

20 Claims, 20 Drawing Sheets

Related U.S. Application Data continuation-in-part of application No. 15/337,449, filed on Oct. 28, 2016, now Pat. No. 9,868,133.

(51) Int. Cl.
  *B05B 12/20* (2018.01)
  *B05D 1/32* (2006.01)
(52) U.S. Cl.
  CPC ........ *Y10T 428/14* (2015.01); *Y10T 428/1476* (2015.01); *Y10T 428/24174* (2015.01)

(56) References Cited

U.S. PATENT DOCUMENTS

| | | |
|---|---|---|
| 4,550,683 A | 11/1985 | Jones |
| 4,787,158 A | 11/1988 | Vitol |
| 4,802,259 A | 2/1989 | Geslewitz |
| 5,037,501 A | 8/1991 | Lawson |
| 5,098,786 A | 3/1992 | Hanke |
| 5,441,769 A | 8/1995 | Ross |
| 5,464,692 A | 11/1995 | Huber |
| 5,468,538 A | 11/1995 | Nameche |
| 5,514,442 A | 5/1996 | Galda et al. |
| 5,618,600 A | 4/1997 | Denklau |
| 5,631,055 A | 5/1997 | Vines et al. |
| 5,654,055 A | 8/1997 | Cox et al. |
| 5,776,572 A | 7/1998 | Lipson |
| 5,800,894 A | 9/1998 | Navis |
| 6,656,558 B1 | 12/2003 | Sarajian |
| 8,877,311 B1 | 11/2014 | Avila et al. |
| 2008/0216946 A1 | 9/2008 | White |

FOREIGN PATENT DOCUMENTS

| | | |
|---|---|---|
| WO | 92026794 | 4/1992 |
| WO | 9216367 | 10/1992 |
| WO | 03021067 | 3/2013 |

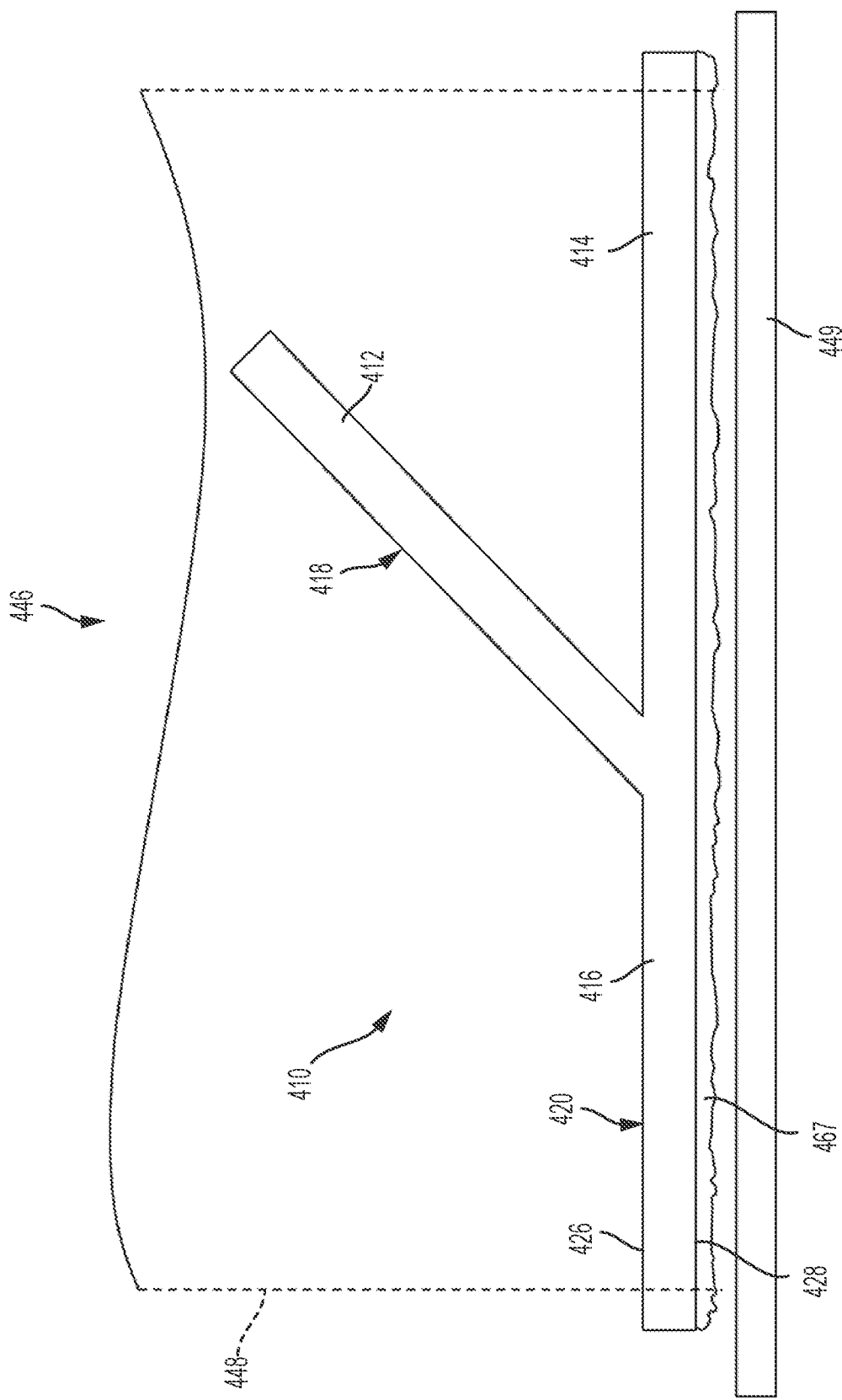

MASKING DEVICE

CROSS-REFERENCE TO RELATED APPLICATIONS

This application is a continuation of U.S. patent application Ser. No. 15/668,374, filed Aug. 3, 2017, and issued on Jan. 29, 2019, as U.S. Pat. No. 10,189,043, which is a continuation-in-part of U.S. patent application Ser. No. 15/337,449, filed Oct. 28, 2016 and issued on Jan. 16, 2018, as U.S. Pat. No. 9,868,133. This application claims priority to the above referenced applications, and the entire contents of these applications are incorporated herein.

BACKGROUND

The present invention relates to masking devices, and more particularly, to masking devices having pull tabs extending upwardly therefrom to facilitate easy removal of the masking devices from a masking area.

Masking is often used in tandem with the painting or coating of parts used in the automotive, aerospace, electronics and other industries. The painting or coating of parts may involve liquid coating, plating, powder coating or electroplating. The coating may be applied by a variety of methods including brushing, rolling, spraying, dipping, flow-coating, electro-static coating, and submersion in deposition tanks. The liquid, powder or plating material may be applied to wood, fiberglass, or metal surfaces in order to protect and strengthen those surfaces. The coating protects the surface of a part by preventing electrical leakage, oxidation, corrosion and decay. The cured coating forms a very strong protective layer on the surface that is highly resistant to scratching and chipping.

In most applications, a protective coating is applied to only specific areas of a surface. The areas which will not receive the coating must be covered or masked off. Typically, a paper or polyester film element in the form of masking tape is applied to the surface areas to be masked. The masking tape generally has an adhesive on one side so that it may be affixed to the surface to be masked. Once the painting or coating process has been completed, the masking tape is removed from the surface.

SUMMARY

In one aspect, the invention provides a masking device for covering a masking area. The masking device includes a first member having a first tab portion and a first base portion. The masking device also includes a second member having a second tab portion and a second base portion. A pull tab of the masking device includes the first tab portion coupled to the second tab portion. The masking device further includes a third member having a member connection surface and a masking connection surface. The member connection surface is opposite the masking connection surface. A base of the masking device includes the first base portion, the second base portion, and the third member. A first adhesive couples the member connection surface of the third member to the first base portion and to the second base portion. The masking connection surface of the third member is made to removably attach to the masking area.

Other aspects of the invention will become apparent by consideration of the detailed description and accompanying drawings.

BRIEF DESCRIPTION OF THE DRAWINGS

FIG. 25 is a schematic of a manufacturing process utilized to fabricate the masking device of FIG. 23.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
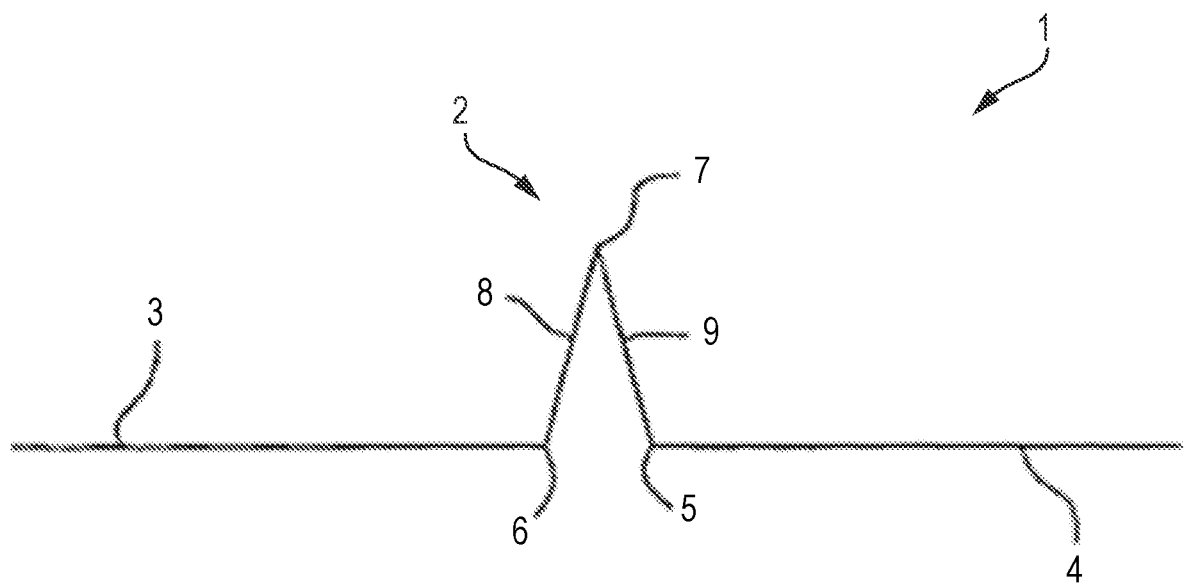
FIG. 1 is a plan view of a prior art masking device.

FIG. 1 illustrates a prior art masking device 1 for masking a masking area. As shown, the masking device 1 includes a pull tab 2 extending upwardly, a top surface 3, and a bottom surface 4 opposite the top surface 3. An adhesive is applied to the bottom surface 4 so that the masking device 1 may be affixed to the masking area. The tab 2 is created by folding the masking device 1 along folding lines 5, 6, and 7. Another adhesive is applied to the bottom surface of side member 8 and 9, causing the two members 8, 9 to be joined together to form the tab 2.

Figure 2:
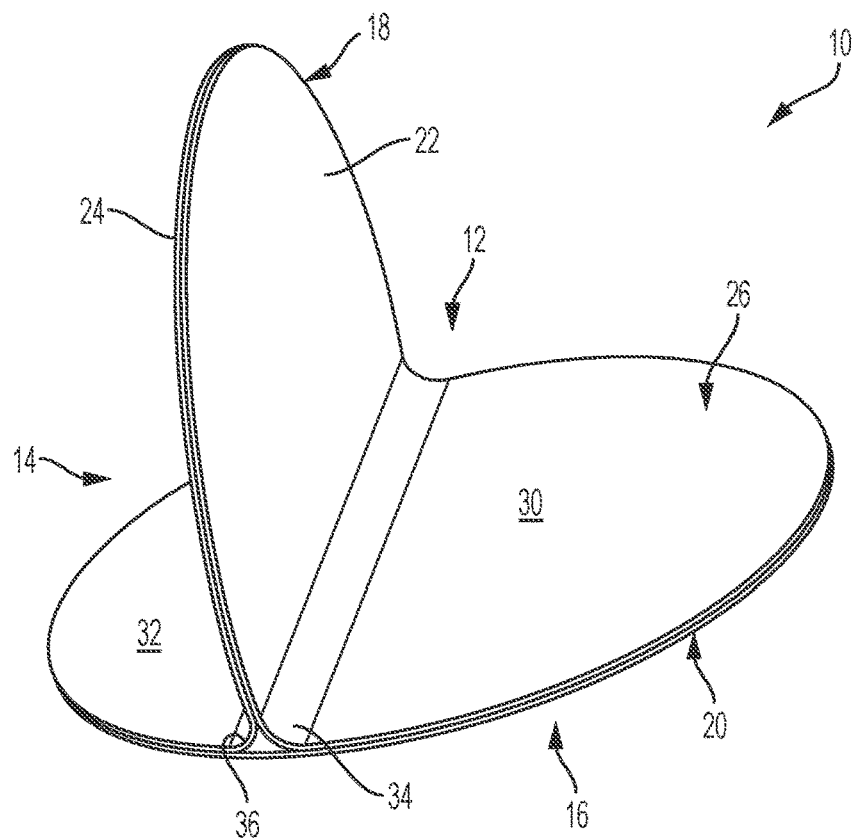
FIG. 2 is a top perspective view of a masking device in accordance with the present invention.
Figure 3:
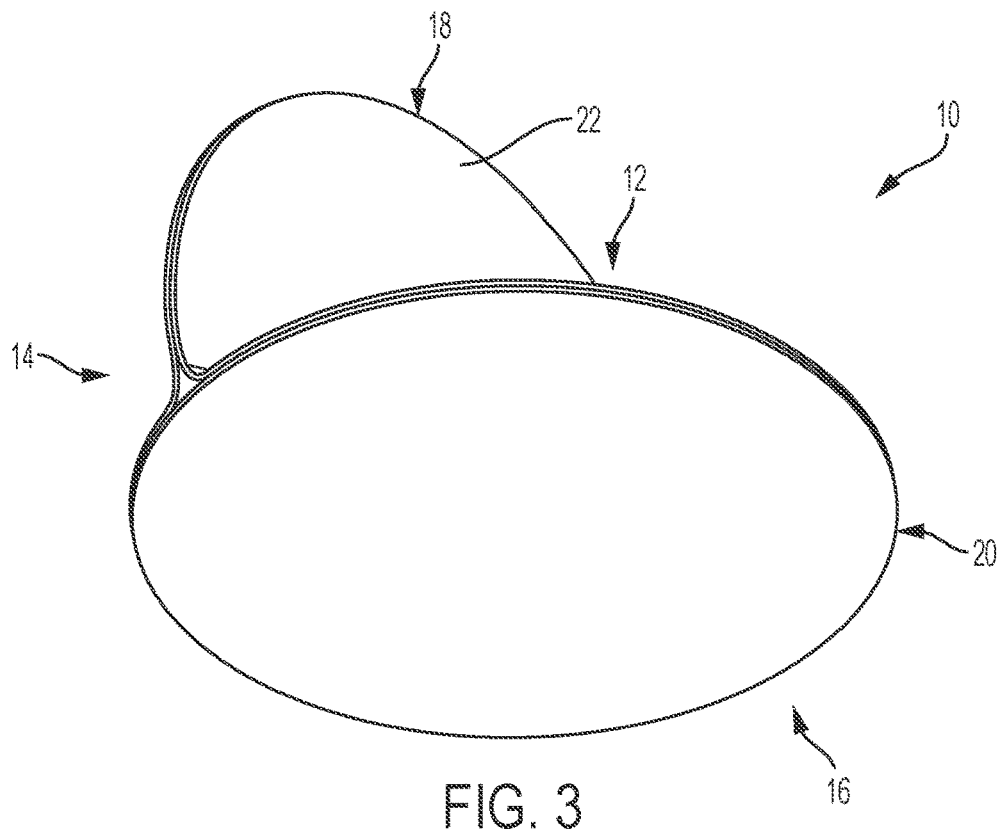
FIG. 3 is a bottom perspective view of the masking device of FIG. 2.

FIGS. 2 and 3 illustrate a masking device 10 of the present invention. The masking device 10 is composed of three separate members—a first member 12, a second member 14, and a third member 16—that together form various aspects of the masking device 10. For example, the masking device 10 includes a pull tab 18 and a base 20. The pull tab 18 is formed by a first portion 22 of the first member 12 and a first portion 24 of the second member 14. The base 20 is formed by a second portion 30 of the first member 12, a second portion 32 of the second member 14, and the entirety of the third member 16. The three members 12, 14, 16 are coupled together via an adhesive to maintain the shape of the masking device 10. In the illustrated embodiment, the masking device 10 is composed of a polymer material (e.g., polyester), while in other embodiments, the masking device 10 may alternatively be composed of other materials, such as paper, cardboard, plastic etc.

With continued reference to FIGS. 2 and 3, the pull tab 18 extends upwardly from the base 20 of the masking device 10. The first portion 22 of the first member 12 and the first portion 24 of the second member 14 together define a gripping area to allow a user to grasp and maneuver the masking device 10. The base 20 includes a top surface 26 and a bottom surface 28 opposite the top surface 26. The bottom surface 28 defines a continuous masking surface such that the bottom surface 28 is completely flat and is provided with an adhesive in order to maintain contact with a masking area when the masking device 10 is applied to the masking area. The top surface 26 of the base 20 includes the second portion 30 of the first member 12 and the second portion 32 of the second member 14. The pull tab 18 is disposed at the intersection of the two portions 30, 32.

Figure 4:
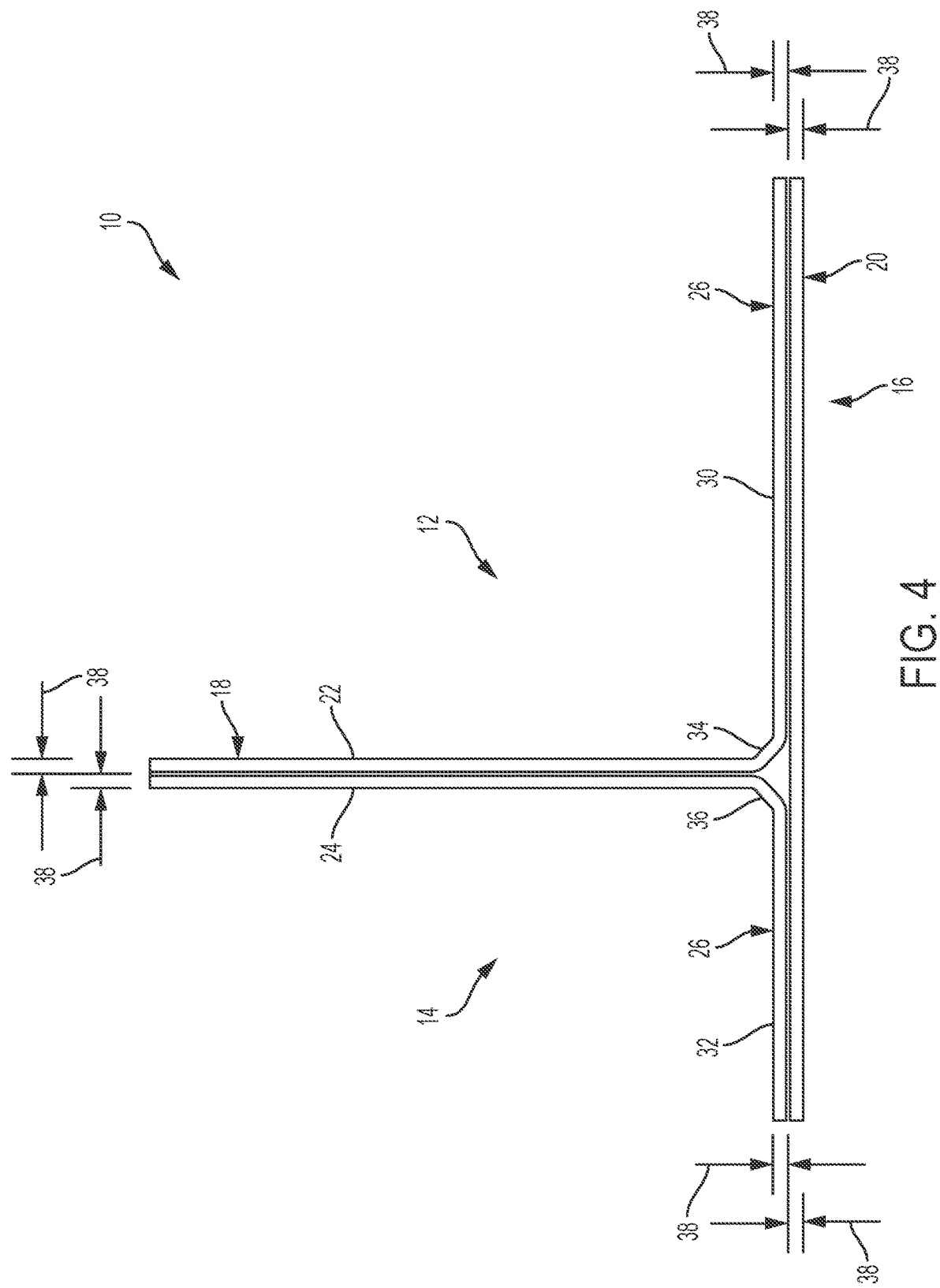
FIG. 4 is a side plan view of the masking device.

Referring now to FIG. 4, the first member 12 is formed as an integral piece and includes a bend 34 (or a fold) disposed between the first portion 22 and the second portion 30. In other words, the first member 12 defines the first portion 22, the second portion 30, and the bend 34 therebetween. Also, the first portion 22 is adjacent to the second portion 30. Similarly, the second member 14 is formed as an integral piece and includes a bend 36 (or a fold) disposed between the first portion 24 and the second portion 32. As such, the second member 14 defines the first portion 24, the second portion 32, and the bend 36 therebetween. The first portion 24 is adjacent to the second portion 32.

As illustrated in FIG. 4, each member 12, 14, 16 has a uniform thickness 38. Accordingly, the base 20 is twice as thick as the thickness 38 since the second portion 30 of the first member 12 and the second portion 32 of the second member 14 are coupled to the third member 16. Also, the pull tab 18 is twice as thick as the thickness 38 since the first portion 22 of the first member 12 is coupled to the first portion 24 of the second member 14.

Figure 5:
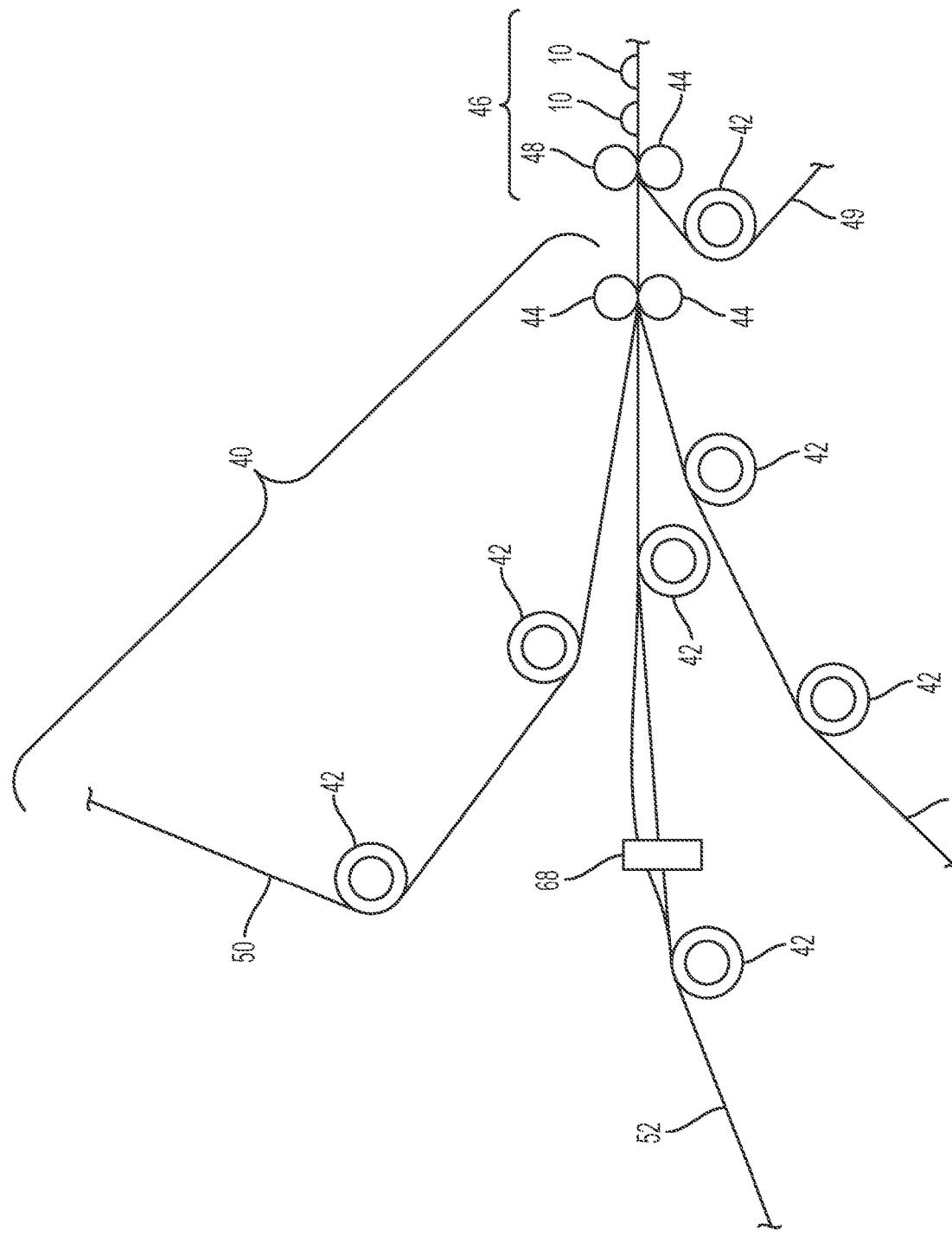
FIG. 5 is a schematic of a manufacturing process utilized to fabricate the masking device.
Figure 8:
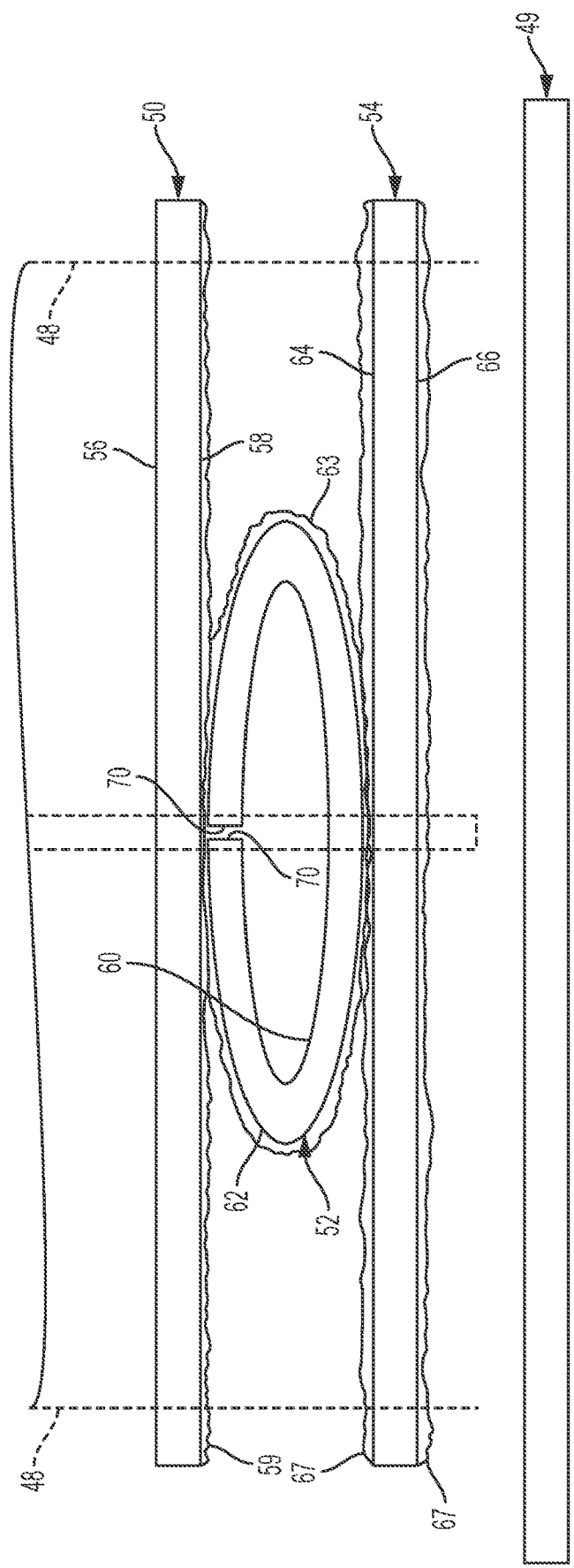
FIG. 8 is another schematic of the manufacturing process utilized to fabricate the masking device.
Figure 9:
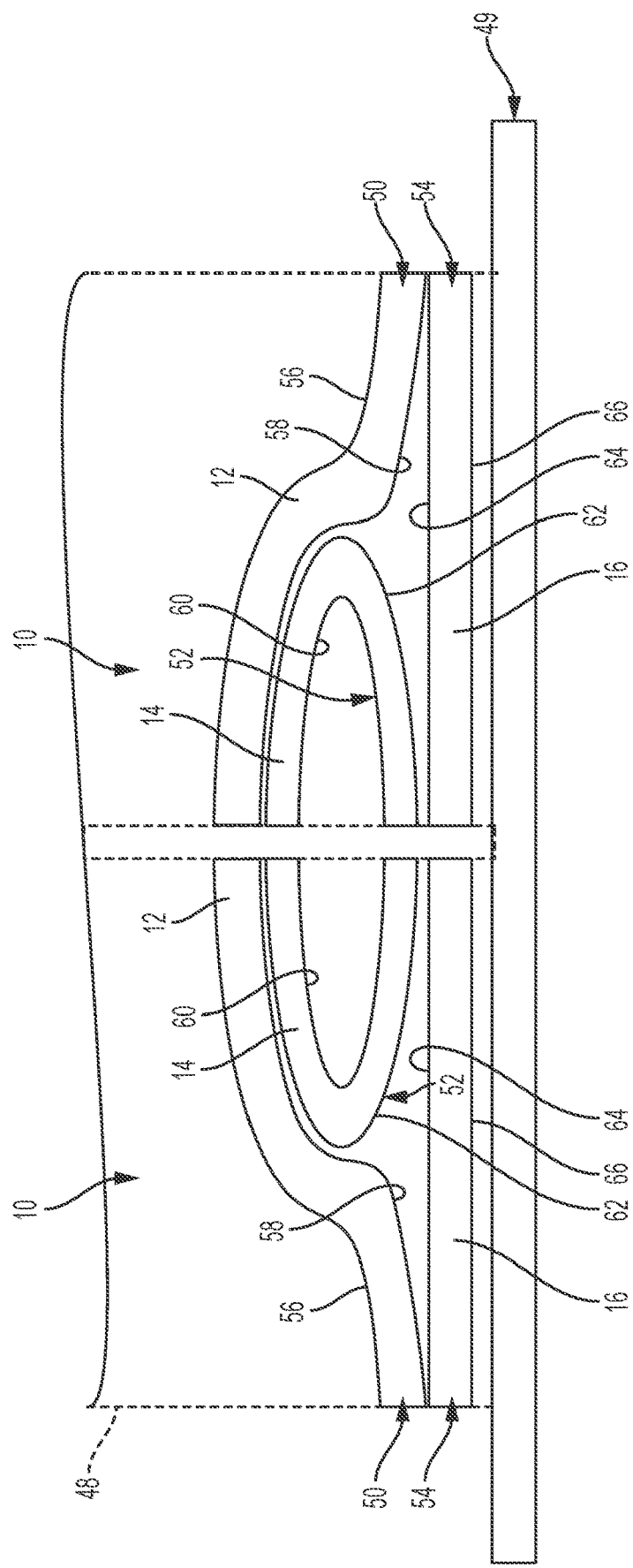
FIG. 9 is another schematic of the manufacturing process utilized to fabricate the masking device.
Figure 10:
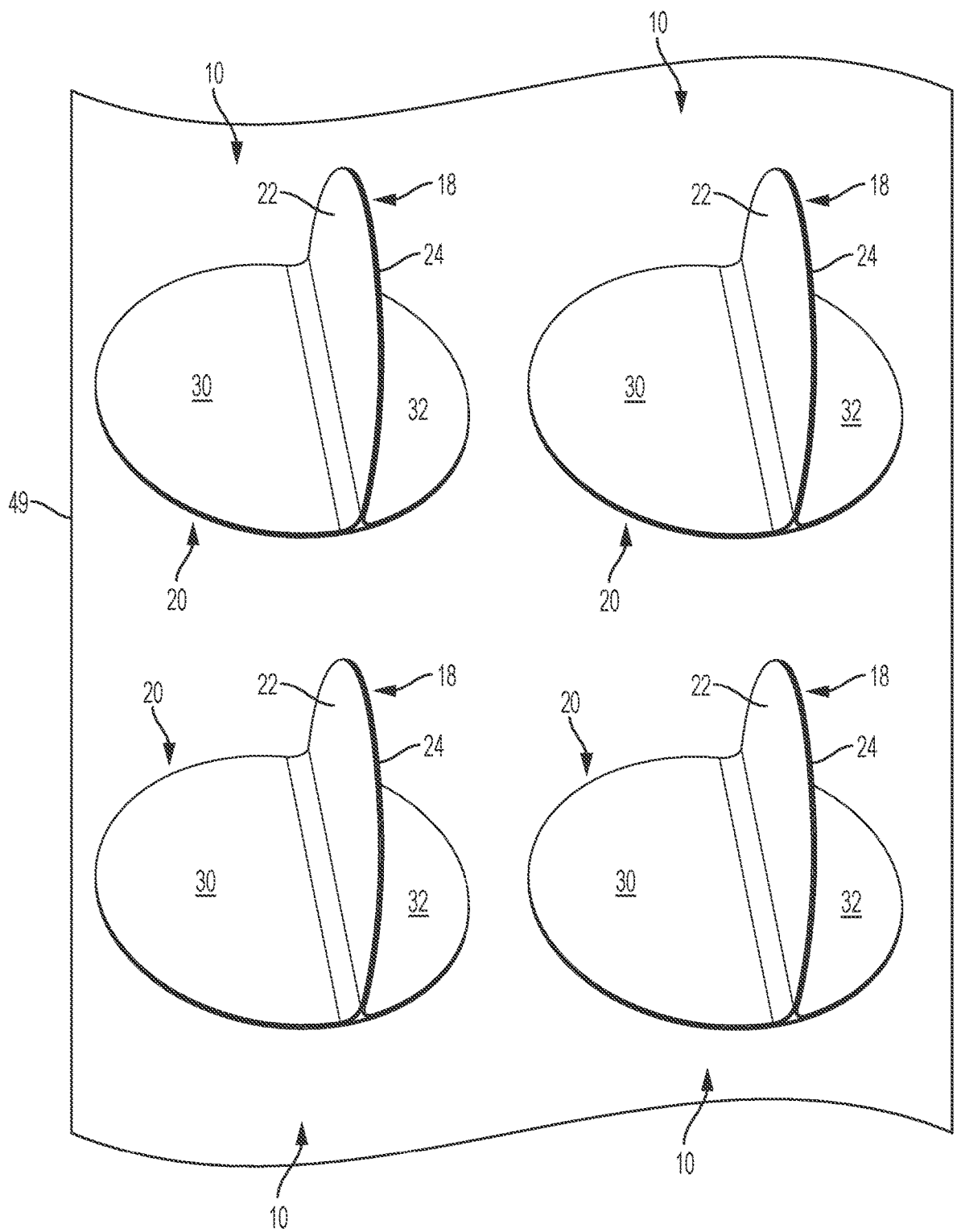
FIG. 10 is a perspective view of a plurality of masking devices.

With reference to FIGS. 5-10, the masking device 10 is fabricated in two manufacturing stages 40, 46, as described in more detail below. In the first manufacturing stage 40, the three members 12, 14, 16 are coupled (or merged) together by using a series of guide rollers 42 and press rollers 44 (FIG. 5). In the second manufacturing stage 46, the masking device 10 is formed with a rotary die 48 by cutting each member 12, 14, 16 to form the circular-shape of the masking device 10. Once the masking device 10 passes the rotary die 48, multiple masking devices 10 are applied to a release liner 49 (e.g., a polymer liner), as shown in FIGS. 5 and 9. The release liner 49 has a coating that allows the masking devices 10 to be easily removed for attachment to the masking area. Also, the masking device 10 can be removed from the masking area without the masking device 10 uncoupling and without leaving a residue on the masking area. The release liner 49 provides an easy way to package the masking devices 10 for sale or use (FIG. 10).

Figure 6:
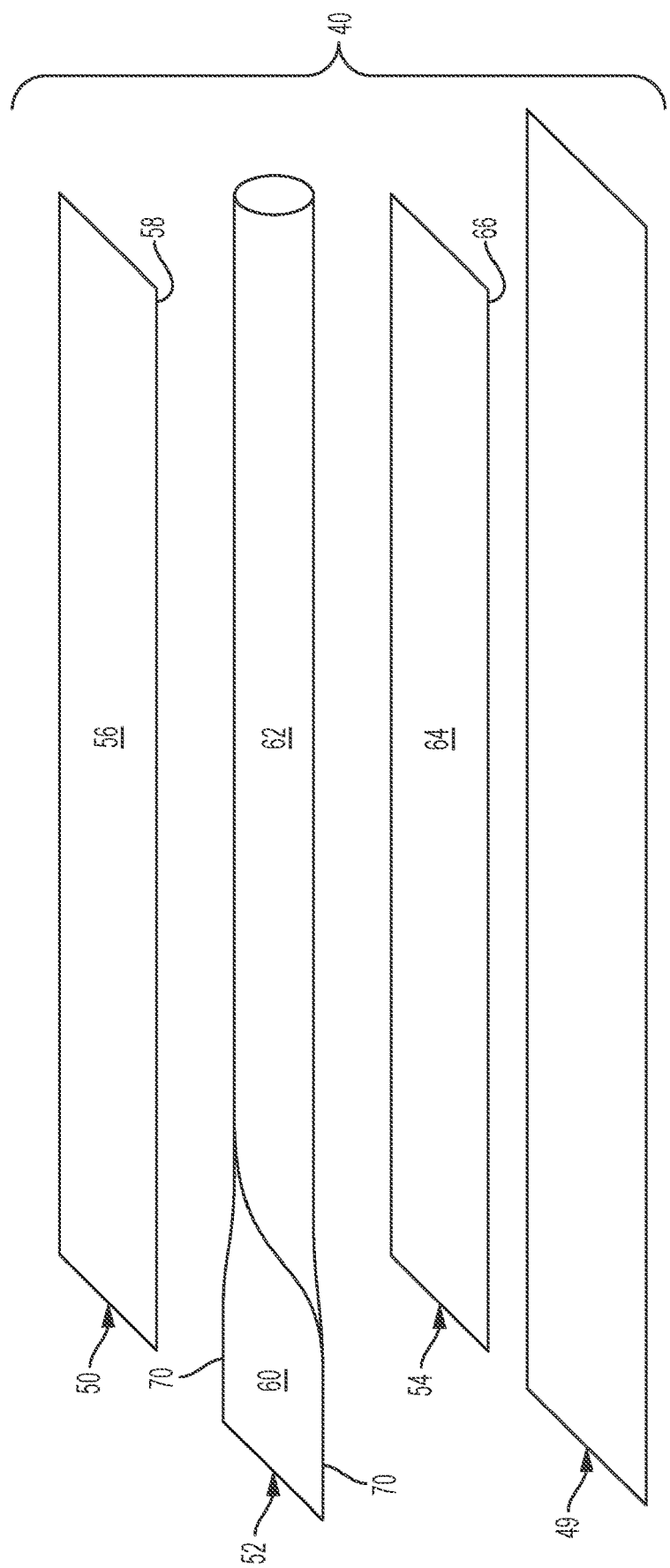
FIG. 6 is another schematic of the manufacturing process utilized to fabricate the masking device.
Figure 7:
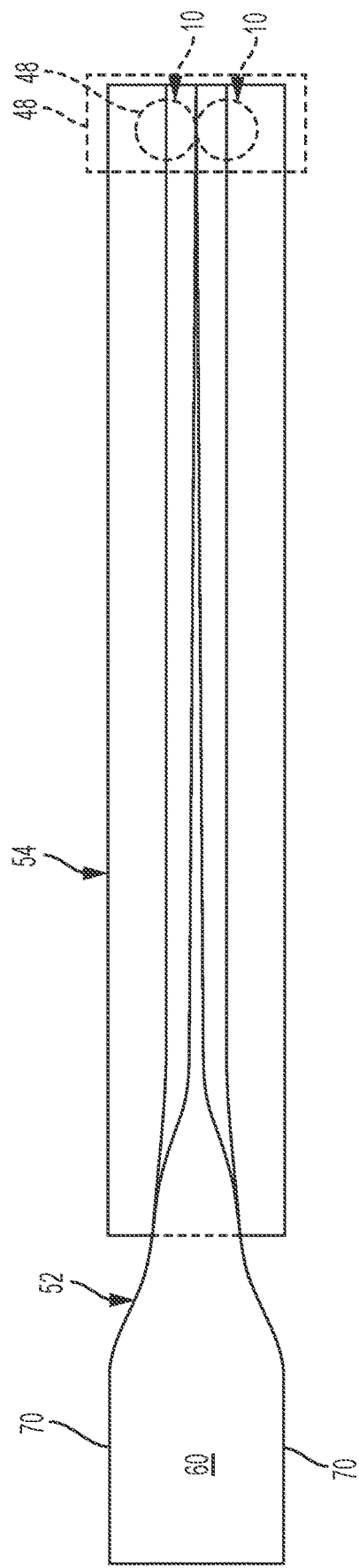
FIG. 7 is another schematic of the manufacturing process utilized to fabricate the masking device.

With reference to FIG. 5-9, the three members 12, 14, 16 are formed from three separate tapes 50, 52, 54. Specifically, the first member 12 is formed from the first tape 50. Also, the second member 14 is formed from the second tape 52. Lastly, the third member 16 is formed from the third tape 52. As illustrated in FIGS. 6 and 8, the first tape 50 has a first face 56 that forms the first portion 22 and the second portion 30 of the first member 12. The first tape 50 also has a second face 58 that couples to the second and third members 14, 16. The second face 58 of the first tape 50 includes an adhesive 59 while the first face 56 does not (FIG. 8). Also, the second tape 52 has a first face 60 that forms the first portion 24 and the second portion 32 of the second member 14. The second tape 52 also has a second face 62 that couples to the first and third members 12, 16. The second face 62 of the second tape 52 includes an adhesive 63 while the first face 60 does not (FIG. 8). Further, the third tape 54 has a first face 64 that couples to the second portions 30, 32 of the first and second members 12, 14. The third tape 54 also has a second face 66 that couples to the release liner 49. The first face 64 and the second face 66 of the third tape 54 include an adhesive 67 (FIG. 8). In the illustrated embodiment (i.e., the masking device 10 composed of polyester), the adhesives 59, 63, 67 of each tape 50, 52, 54 is a silicone base adhesive having a peel adhesion of approximately 25-40 ounces per inch and having a thickness of approximately 0.5 to 2.5 millimeters. Specifically, the adhesives 59, 63, 67 have a peel adhesion of 35 ounces per inch and have a thickness of approximately 1.5 millimeters. In some embodiments, the adhesives 59, 63 of the tapes 50, 52 is more aggressive (i.e., stronger, thicker, greater peel adhesion, etc.) than the adhesive 67 of the tape 54 to permit removal of the masking device 10 from the masking area and release liner 49 while inhibiting the members 12, 14, 16 from uncoupling during such removal. Also, in some embodiments, the adhesives 59, 63, 67 could alternatively be a resin-based adhesive, an acrylic-based adhesive, a rubber-based adhesive, a silicone-based adhesive, or other similar types of adhesives.

In the first manufacturing stage 40, the three tapes 50, 52, 54 are conveyed along an assembly line, such as guide rollers 42, and eventually converge to contact each other via press rollers 44. Prior to converging, the second tape 52 is curled via a curling elements 68 (FIG. 5) such that lateral edges 70 (FIGS. 6 and 7) are urged toward each other and contact each other. As a result, the second tape 52 becomes tubular shaped. However, one of the guide rollers 42 flattens the tubular shape of second tape 52 (FIG. 5) prior to passing through the press rollers 44. Thus, the adhesive 63 on second face 62 of the second tape 52 faces outwardly toward both the first and third tape 50, 54, as shown in FIGS. 6 and 8. When the tapes 50, 52, 54 converge, the adhesive 59 on the second face 58 of the first tape 50 couples to the adhesive 63 on the second face 62 of the second tape 52. Also, the adhesive 67 on the first face 64 of the third tape 54 couples to both the adhesive 59 on the second face 58 of the first tape 50 and the adhesive 63 on the second face 62 of the second tape 52. Lastly, the adhesive 67 on the second face 66 of the third tape 54 couples to the release liner 49.

In the second manufacturing stage 46, the rotary die 48 cuts through the three tapes 50, 52, 54 in a circular pattern (FIG. 7), thereby creating the circular-shape of the masking device 10. The rotary die 48 only cuts deep enough to cut through the three tapes 50, 52, 54 while leaving the release liner 49 uncut, as shown in FIGS. 9 and 10.

In operation, the pull tab 18 is used to ease the application and the removal of the masking device 10 from the masking area. The masking device 10 is simply applied to the desired masking area by gripping the pull tab 18, removing the masking device 10 from the release liner 49, and applying it to the masking area. After the masking area has been coated, the masking device 10 is removed from the masking area by pulling upwardly on the pull tab 18.

Figure 11:
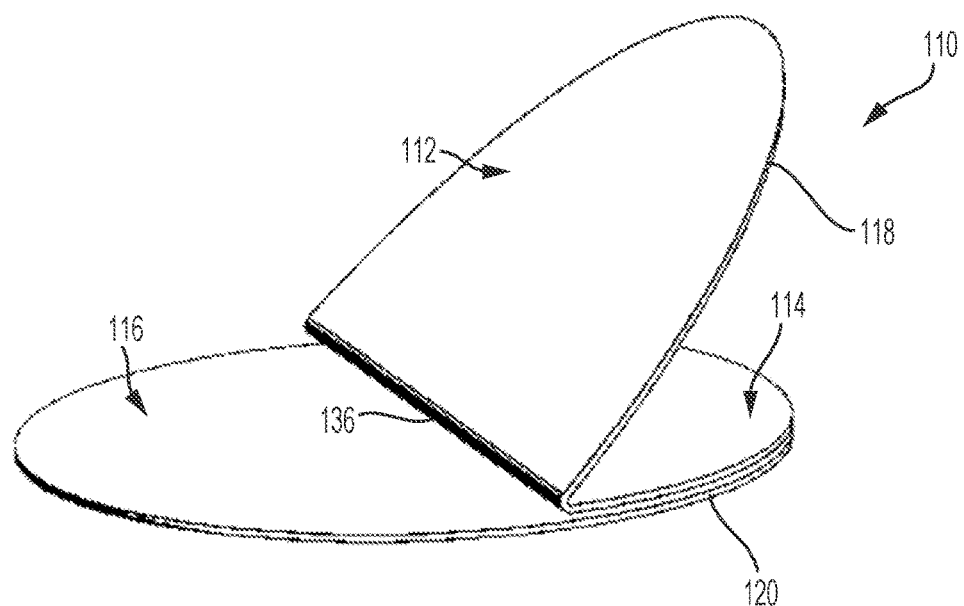
FIG. 11 is a top perspective view of a masking device in accordance with another embodiment of the present invention.
Figure 12:
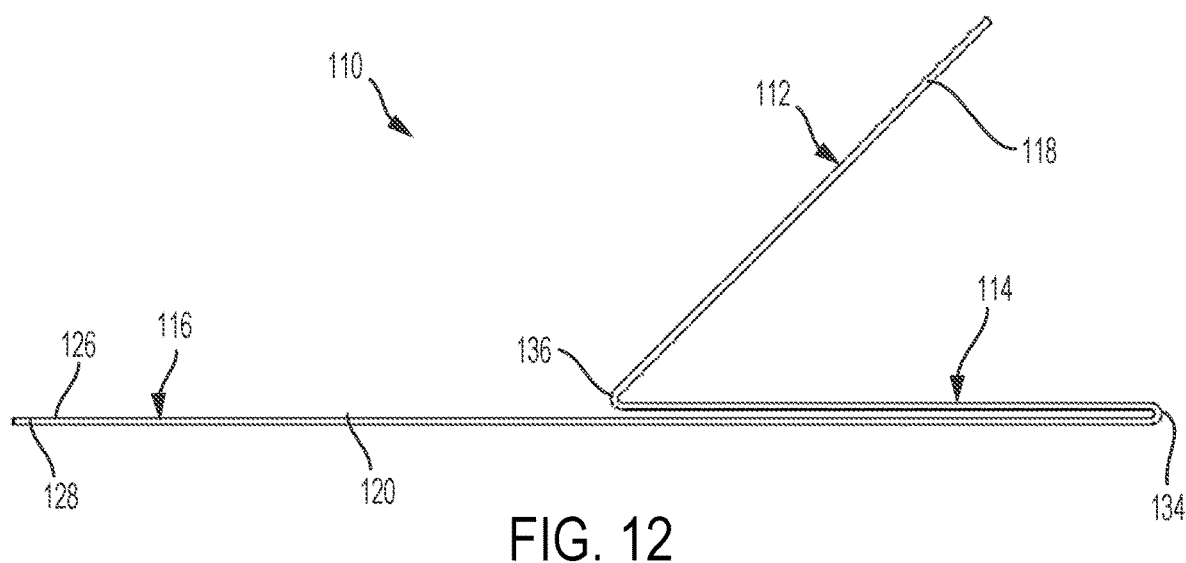
FIG. 12 is a side plan view of the masking device of FIG. 11.

FIGS. 11 and 12 illustrate a masking device 110 in accordance with another embodiment of the invention. The masking device 110 is made from a single piece of tape 150, but is otherwise similar to the masking device 10 described above with reference to FIGS. 2-10, with like components being shown with like reference numerals plus 100. Differences between the masking device 10, 110 are described below.

Figure 15:
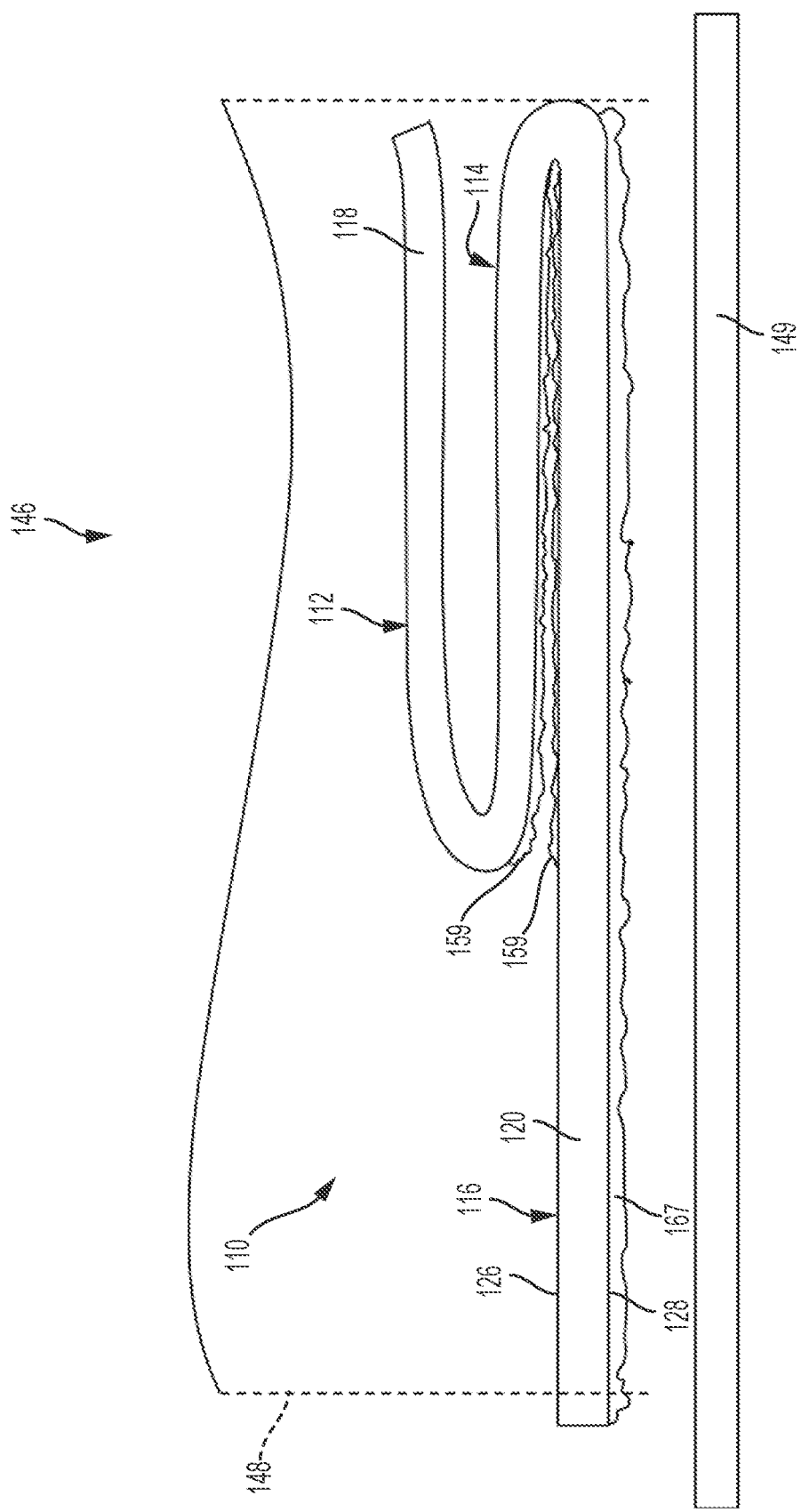
FIG. 15 is another schematic of the manufacturing process utilized to fabricate the masking device of FIG. 11.

The masking device 110 includes a first member 112, a second member 114, and a third member 116—that together form various aspects of the masking device 110. For example, the masking device 110 includes a pull tab 118 and a base 120. The pull tab 118 is formed by the first member 112 and the base 120 is formed by the third member 116. The three members 112, 114, 116 are coupled together via an adhesive 159 to maintain the shape of the masking device 110. The masking device 110 is bent with multiple bends 134, 136 to form the general S-shaped masking device 110. The members 112, 114, 116 are all integrally formed together. The bend 134 is disposed between the third member 116 and the second member 114, while the bend 136 is disposed between the first member 112 and the second member 114. The third member 116 forms the entirety of a base 120, which is provided to contact and cover a masking area. The base 120 includes a top surface 126 and a bottom surface 128 opposite the top surface 126. The bottom surface 128 defines a continuous masking surface such that the bottom surface 128 is completely flat and is provided with an adhesive 167 (FIG. 15) in order to maintain contact with a masking area when the masking device 110 is applied to the masking area. The top surface 126 is also provided with the adhesive 159 but only in the region where the second member 114 overlaps the third member 116 in order to couple the second member 114 to the top surface 126 of the base 120. The second member 114 also includes the adhesive 159 (FIG. 15) to adhere to the adhesive 159 of the third member 116. In some embodiments, the adhesive 159 is more aggressive (i.e., stronger, thicker, greater peel adhesion, etc.) than the adhesive 167 to permit removal of the masking device 110 from the masking area and release liner 149 while inhibiting the members 114, 116 from uncoupling during such removal. In the illustrated embodiment, the masking device 110 is composed of a polymer material (e.g., polyester), while in other embodiments, the masking device 110 may alternatively be composed of other materials, such as paper, cardboard, plastic etc.

Further, the first member 112 forms the entirety of a pull tab 118. The pull tab 118 defines a gripping area to allow a user to grasp and maneuver the masking device 110. The second member 114 couples the pull tab 118 to the base 120 so that the base 120 can be removed from a masking area by pulling upwardly on the pull tab 118.

Figure 13:
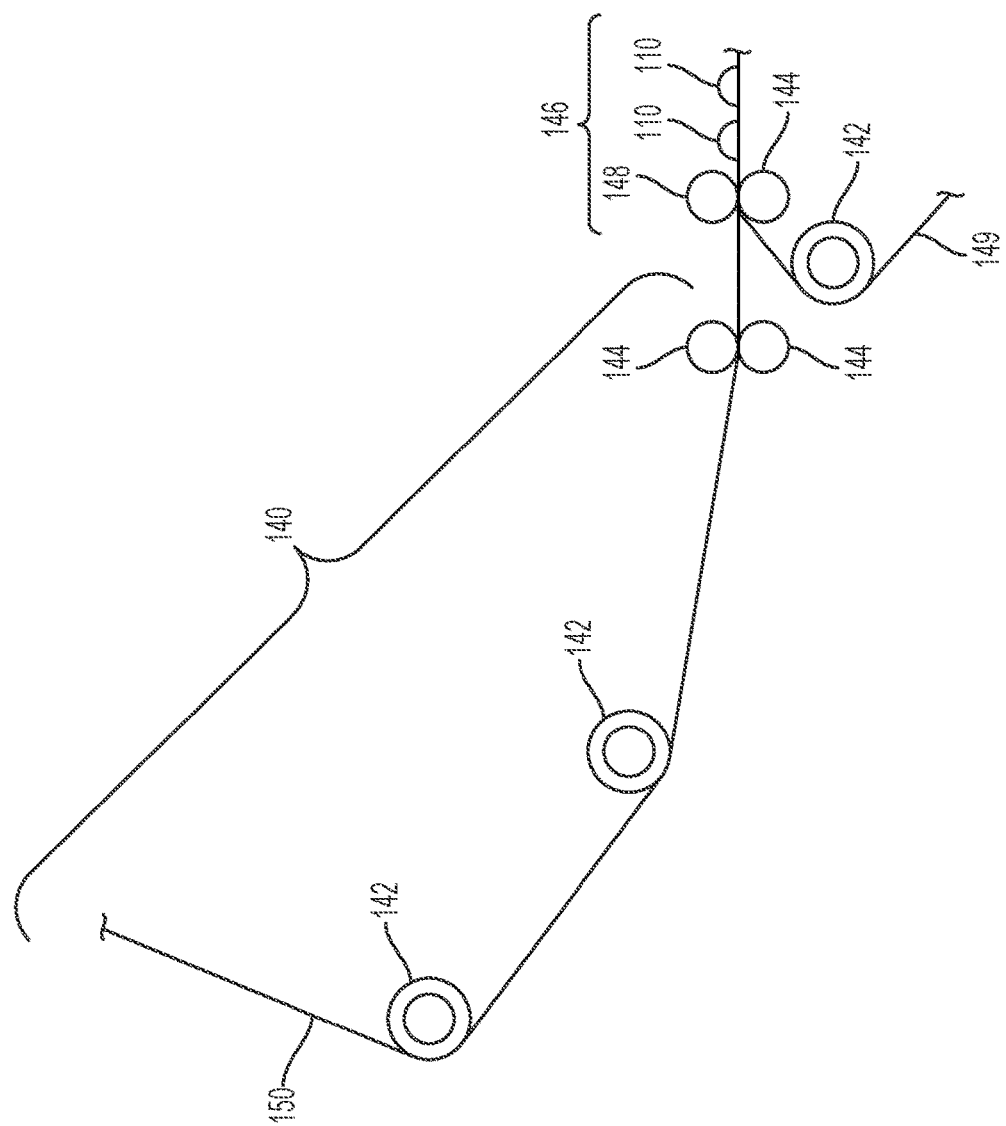
FIG. 13 is a schematic of a manufacturing process utilized to fabricate the masking device of FIG. 11.
Figure 14:
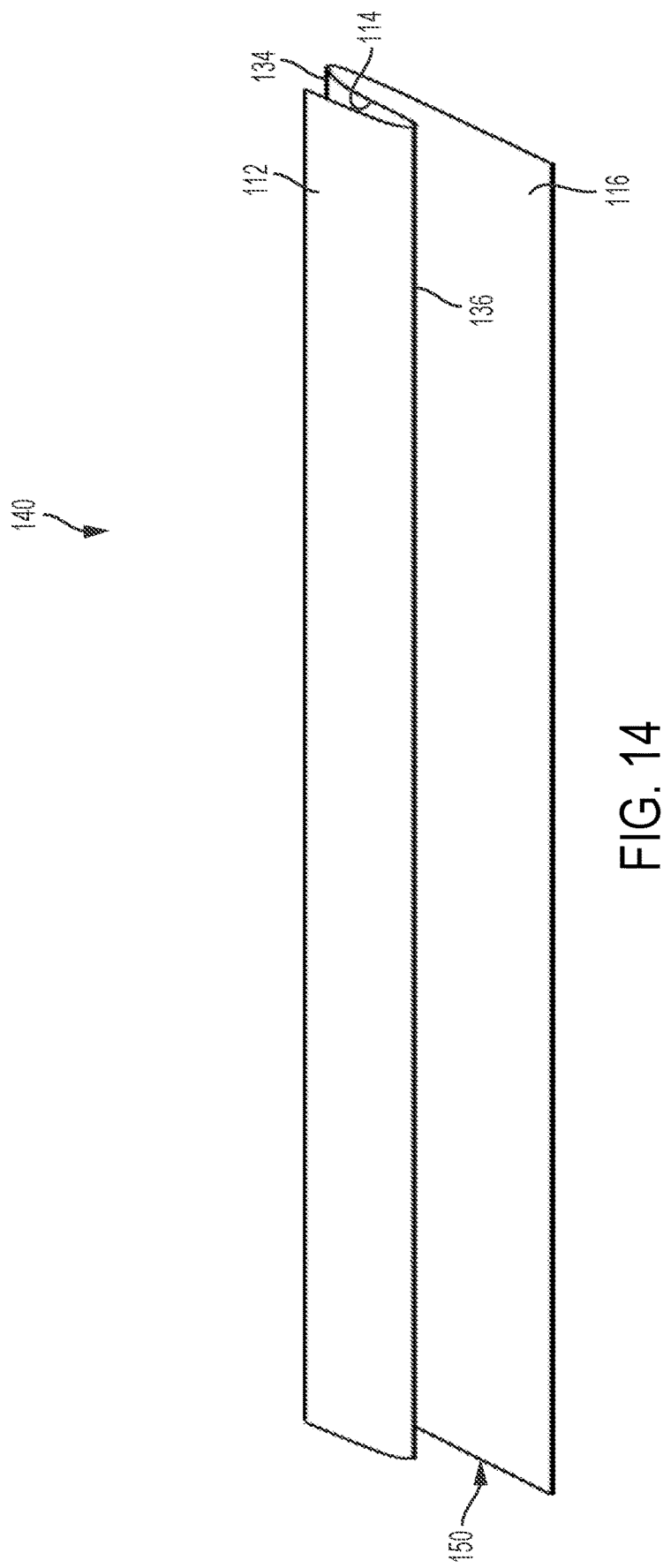
FIG. 14 is another schematic of the manufacturing process utilized to fabricate the masking device of FIG. 11.

The masking device 110 is fabricated in two manufacturing stages 140, 146. In the first manufacturing stage 140, the masking device 110 is formed by a single piece of tape 150 that is folded to form the three members 112, 114, 116 (FIG. 14) by using a series of guide rollers 242 and press rollers 244 (FIG. 13). In the second manufacturing stage 146, the masking device 110 is formed with a rotary die 148 (FIG. 15) by cutting through the tape 150 to form the circular-shape of the masking device 110. Once the masking device 110 passes the rotary die 148, multiple masking devices 110 are applied to the release liner 149 (e.g., a polymer liner). The release liner 149 has a coating that allows the masking devices 110 to be easily removed for attachment to the masking area. Also, the masking device 110 can be removed from the masking area without the masking device 110 uncoupling and without leaving a residue on the masking area because the adhesive 159 between the second member 114 and the third member 116 is stronger than the adhesive 167 on the bottom surface 128 of the base 120. The release liner 149 provides an easy way to package the masking devices 110 for sale or use.

Figure 16:
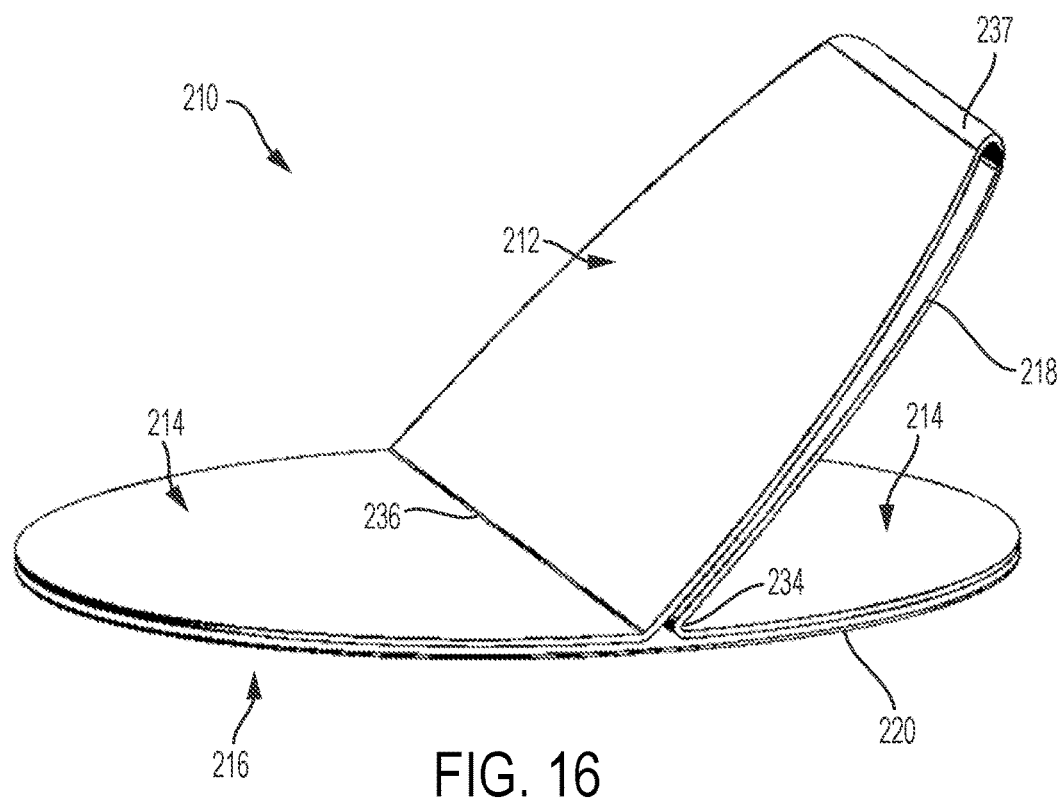
FIG. 16 is a top perspective view of a masking device in accordance with another embodiment of the present invention.
Figure 17:
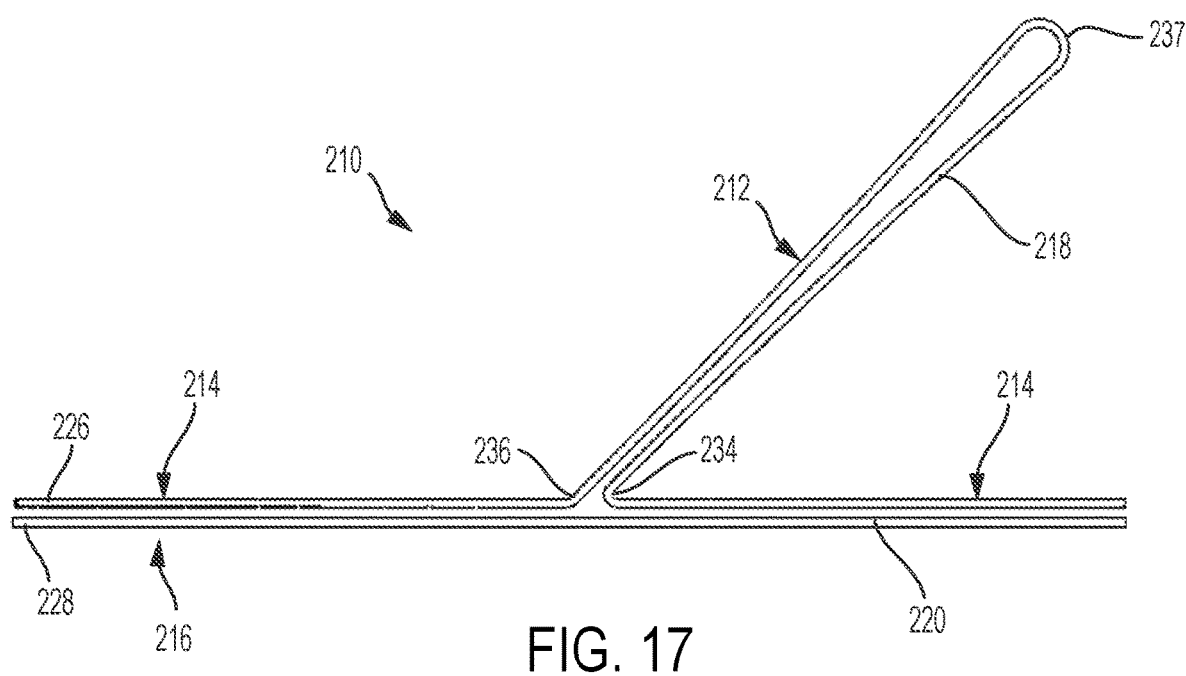
FIG. 17 is a side plan view of the masking device of FIG. 16.

FIGS. 16 and 17 illustrate a masking device 210 in accordance with another embodiment of the invention. The masking device 210 is formed by two pieces of tape 250, 254, but is otherwise similar to the masking device 10 described above with reference to FIGS. 2-10, with like components being shown with like reference numerals plus 200. Differences between the masking device 10, 210 are described below.

The masking device 210 is includes a first member 212, a second member 214, and a third member 216—that together form various aspects of the masking device 210. For example, the masking device 210 includes a pull tab 218 and a base 220. The pull tab 218 is formed by the first member 212 and defines a gripping area to allow a user to grasp and maneuver the masking device 210. The base 220 is formed by the second member 214 and the third member 216. The two members 214, 216 are coupled together via an adhesive 259 to maintain the shape of the masking device 210. In the illustrated embodiment, the masking device 210 is composed of a polymer material (e.g., polyester), while in other embodiments, the masking device 210 may alternatively be composed of other materials, such as paper, cardboard, plastic etc.

The masking device 210 is bent with multiple bends 234, 236, 237 to generally form the masking device 210. The first member 212 and the second member 214 are all integrally formed together. The bends 234, 236 is disposed between the first member 212 and the second member 214, while the bend 237 is disposed within the first member 212.

The base 220 includes a top surface 226 and a bottom surface 228 opposite the top surface 226. The bottom surface 228 defines a continuous masking surface such that the bottom surface 228 is completely flat and is provided with an adhesive 267 in order to maintain contact with a masking area when the masking device 210 is applied to the masking area. The top surface 226 of the base 220 includes the second member 214.

Figure 18:
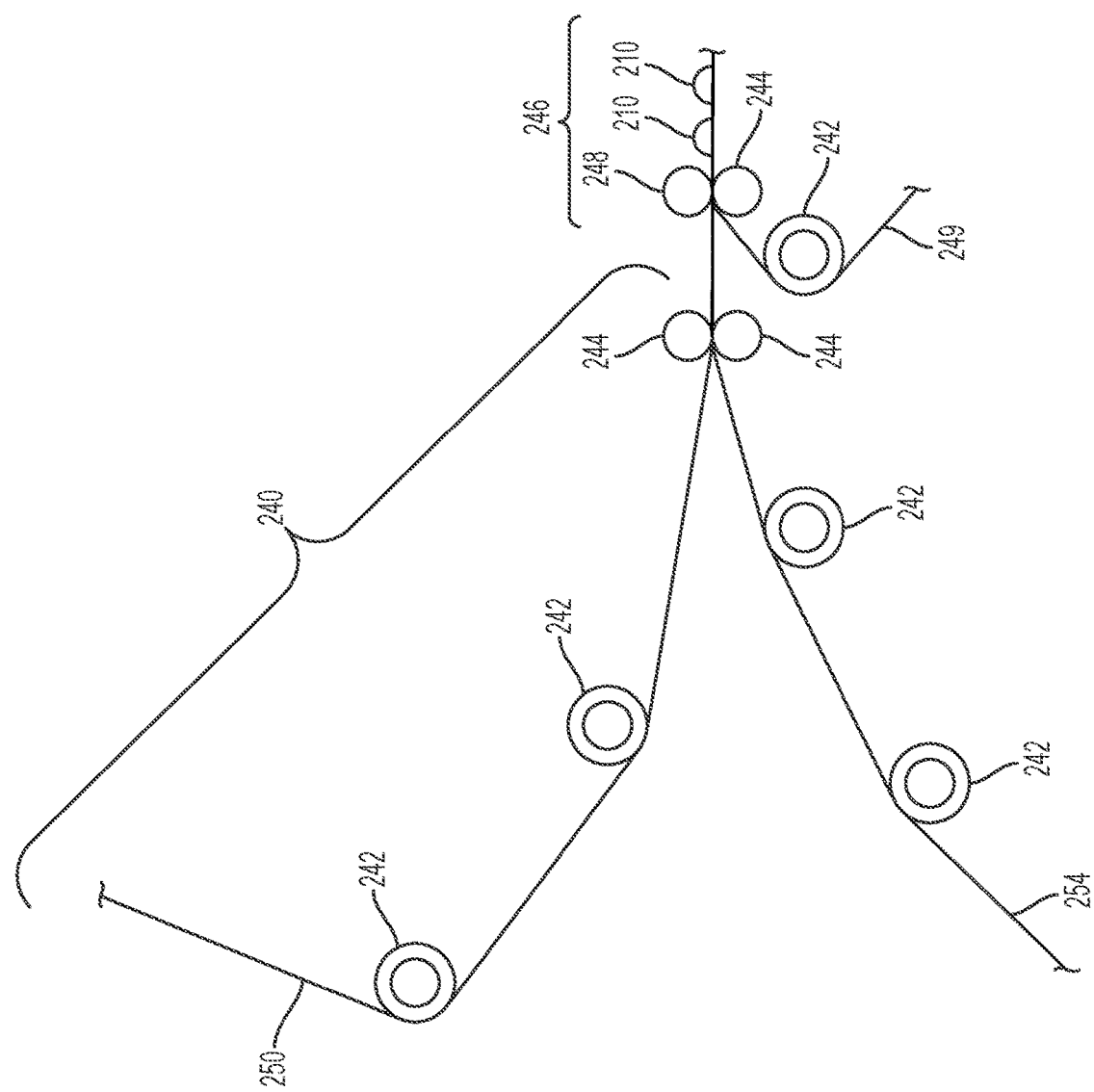
FIG. 18 is a schematic of a manufacturing process utilized to fabricate the masking device of FIG. 16.
Figure 19:
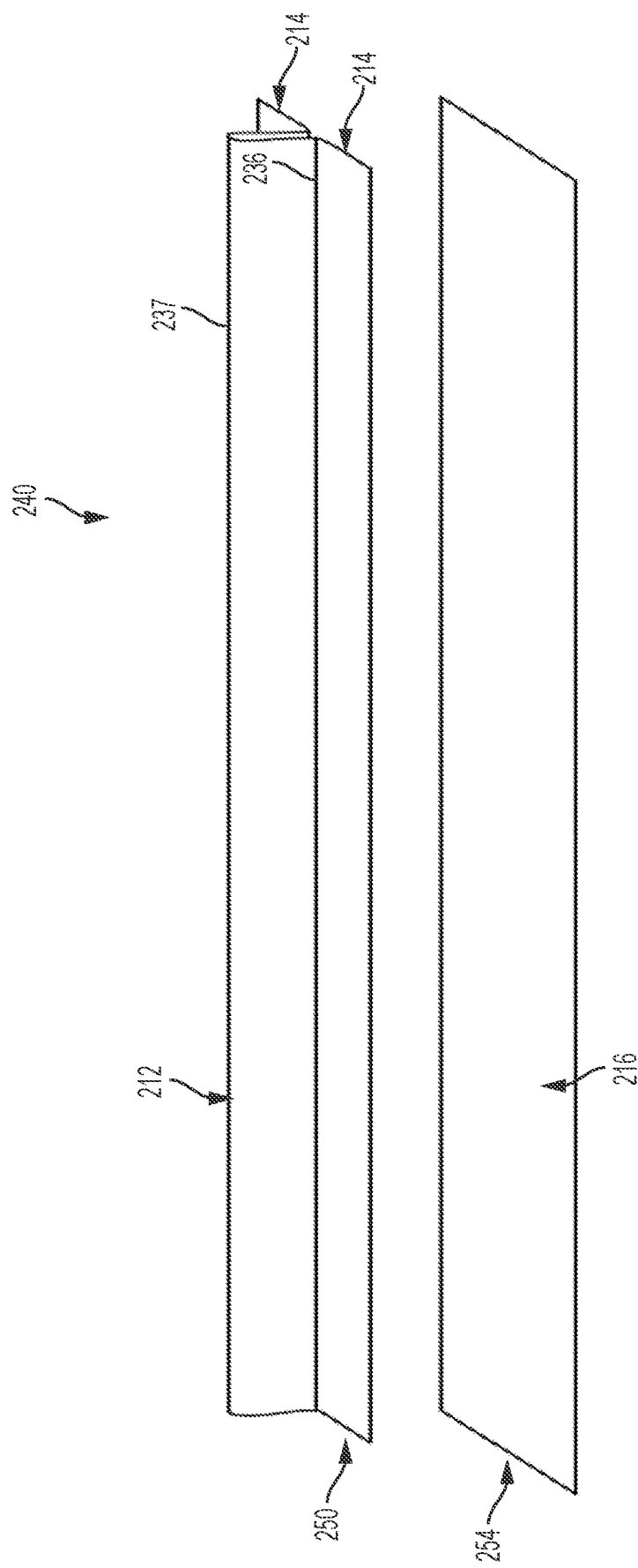
FIG. 19 is a schematic of a manufacturing process utilized to fabricate the masking device of FIG. 16.
Figure 20:
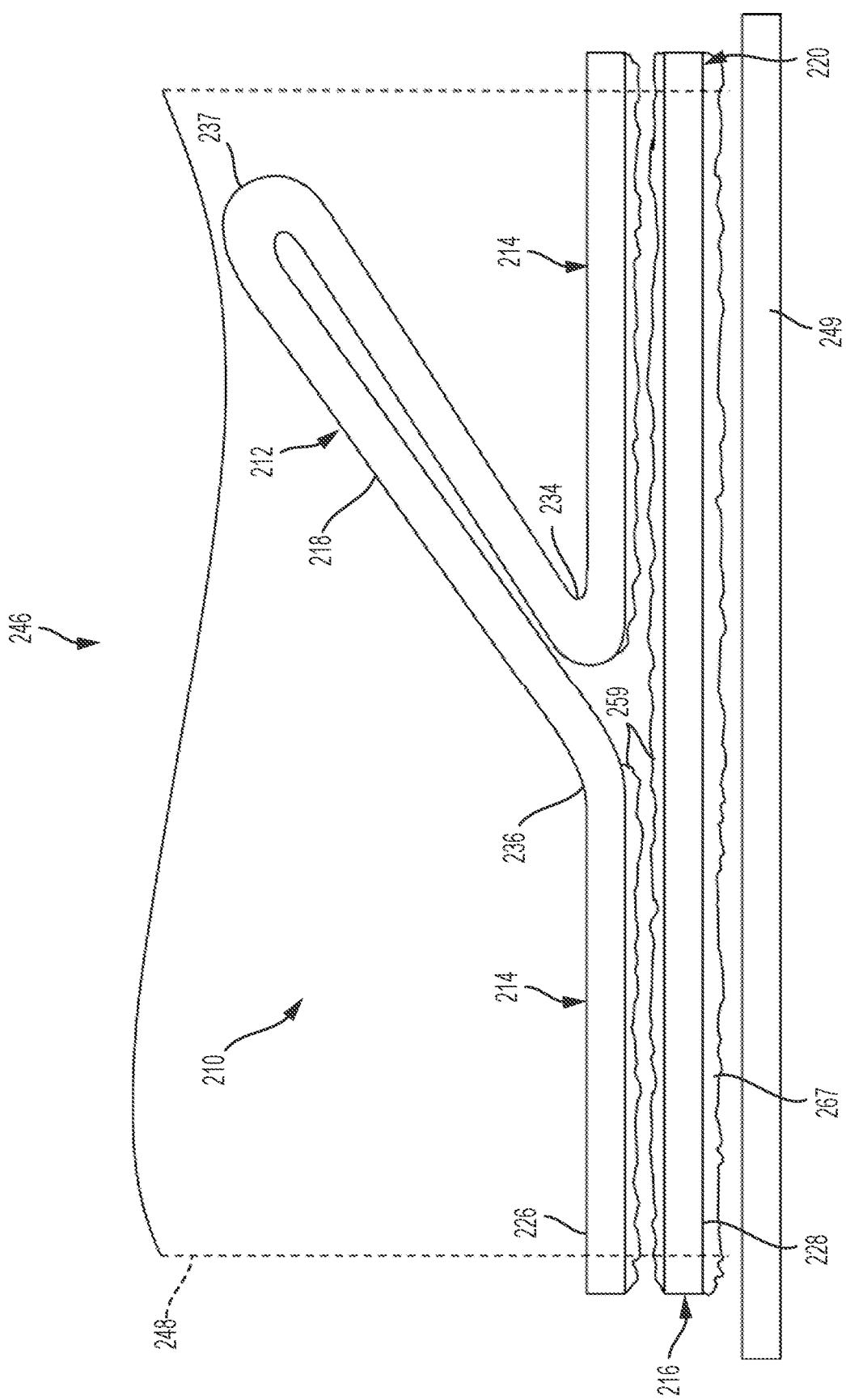
FIG. 20 is a schematic of a manufacturing process utilized to fabricate the masking device of FIG. 16.

The masking device 210 is fabricated in two manufacturing stages 240, 246. In the first manufacturing stage 240 (FIG. 19), the first tape 250 is folded to form the two members 212, 214 and coupled to the second tape 254 by using a series of guide rollers 242 and press rollers 244 (FIG. 18). In the second manufacturing stage 246, the masking device 210 is formed with a rotary die 248 (FIG. 20) by cutting through the tapes 250, 254 to form the circular-shape of the masking device 210. Once the masking device 210 passes the rotary die 248, multiple masking devices 210 are applied to the release liner 249 (e.g., a polymer liner). The release liner 249 has a coating that allows the masking devices 210 to be easily removed for attachment to the masking area. Also, the masking device 210 can be removed from the masking area without the members 214, 216 uncoupling and without leaving a residue on the masking area because the adhesive 259 between the second member 214 and the third member 216 is stronger than the adhesive 267 on the bottom surface 228 of the base 220. The release liner 249 provides an easy way to package the masking devices 210 for sale or use.

Figure 21:
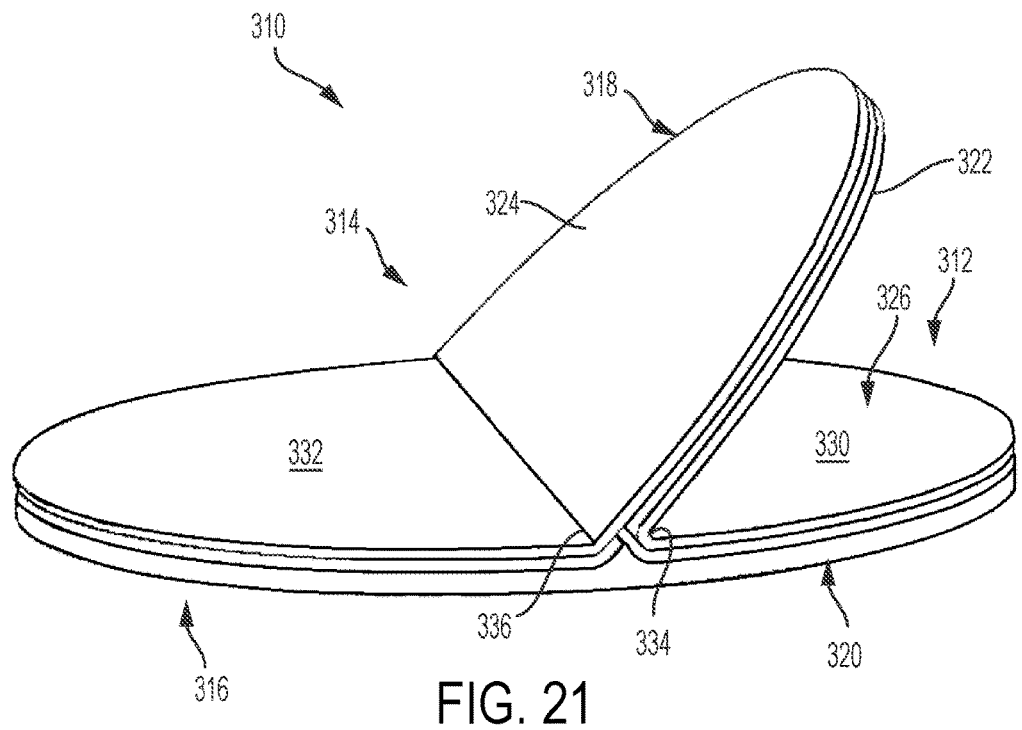
FIG. 21 is a top perspective view of a masking device in accordance with another embodiment of the present invention.
Figure 22:
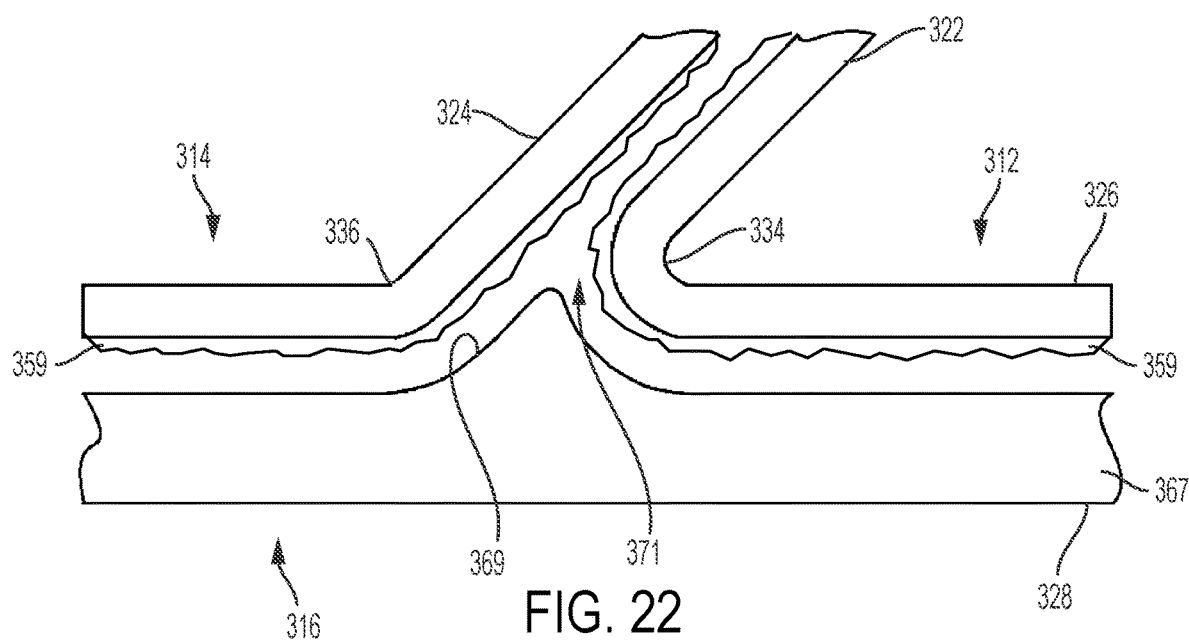
FIG. 22 is an enlarged side plan view of the masking device of FIG. 21.

FIGS. 21 and 22 illustrate a masking device 310 in accordance with another embodiment of the invention. The masking device 310 includes a third member 316 that is silicone adhesive but is otherwise similar to the masking device 10 described above with reference to FIGS. 2-10, with like components being shown with like reference numerals plus 300. Differences between the masking device 10, 310 are described below.

FIGS. 21 and 22 illustrate a masking device 310 composed of three separate members—a first member 312, a second member 314, and a third member 316—that together form various aspects of the masking device 310. For example, the masking device 310 includes a pull tab 318 and a base 320. The pull tab 318 is formed by a first portion 322 of the first member 312 and a first portion 324 of the second member 314. The base 320 is formed by a second portion 330 of the first member 312, a second portion 332 of the second member 314, and the entirety of the third member 316. The three members 312, 314, 316 are coupled together via an adhesive 359 (FIG. 22) to maintain the shape of the masking device 310. In the illustrated embodiment, the first and second member 312, 314 are composed of a polymer material (e.g., polyester) and the third member 316 is composed of a silicone adhesive 367. In other embodiments, the masking device 310 may alternatively be composed of other materials, such as paper, cardboard, plastic etc.

The pull tab 318 extends upwardly from the base 320 of the masking device 310. The first portion 322 of the first member 312 and the first portion 324 of the second member 314 together define a gripping area to allow a user to grasp and maneuver the masking device 310. The base 320 includes a top surface 326 and a bottom surface 328 opposite the top surface 326. The bottom surface 328 defines a continuous masking surface such that the bottom surface 328 is completely flat and includes the silicone adhesive 367 in order to maintain contact with a masking area when the masking device 310 is applied to the masking area. The top surface 326 of the base 320 includes the second portion 330 of the first member 312 and the second portion 332 of the second member 314. The pull tab 318 is disposed at the intersection of the two portions 330, 332.

With continued reference to FIGS. 21 and 22, the first member 312 is formed as an integral piece and includes a bend 334 (or a fold) disposed between the first portion 322 and the second portion 330. In other words, the first member 312 defines the first portion 322, the second portion 330, and the bend 334 therebetween. Also, the first portion 322 is adjacent to the second portion 330. Similarly, the second member 314 is formed as an integral piece and includes a bend 336 (or a fold) disposed between the first portion 324 and the second portion 332. As such, the second member 314 defines the first portion 324, the second portion 332, and the bend 336 therebetween. The first portion 324 is adjacent to the second portion 332.

With reference to FIG. 22, the third member 316 defines a protrusion 369 that fills a space 371 formed between the members 312, 314, 216 when the members 312, 314, 316 are coupled together. The silicone adhesive 367 that forms the third member 316 is pliable, at least during initial assembly of the masking device 310, such that the protrusion 369 is formed when the first and second members 312, 314 are pressed down onto the third member 316. Specifically, the protrusion 369 is formed when the pliable silicone adhesive 367 displaces as a result of a downward force being exerted on the third member 316 during assembly of the members 312, 314 onto the third member 316. The third member 316 has a thickness that is greater than a thickness of the first and second member 312, 314.

Figure 23:
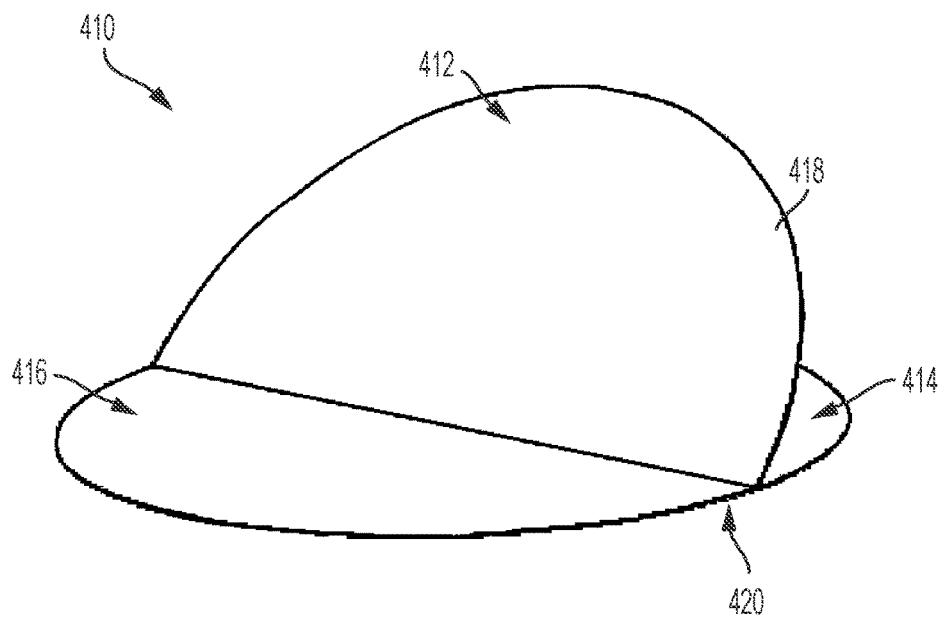
FIG. 23 is a top perspective view of a masking device in accordance with another embodiment of the present invention.
Figure 24:
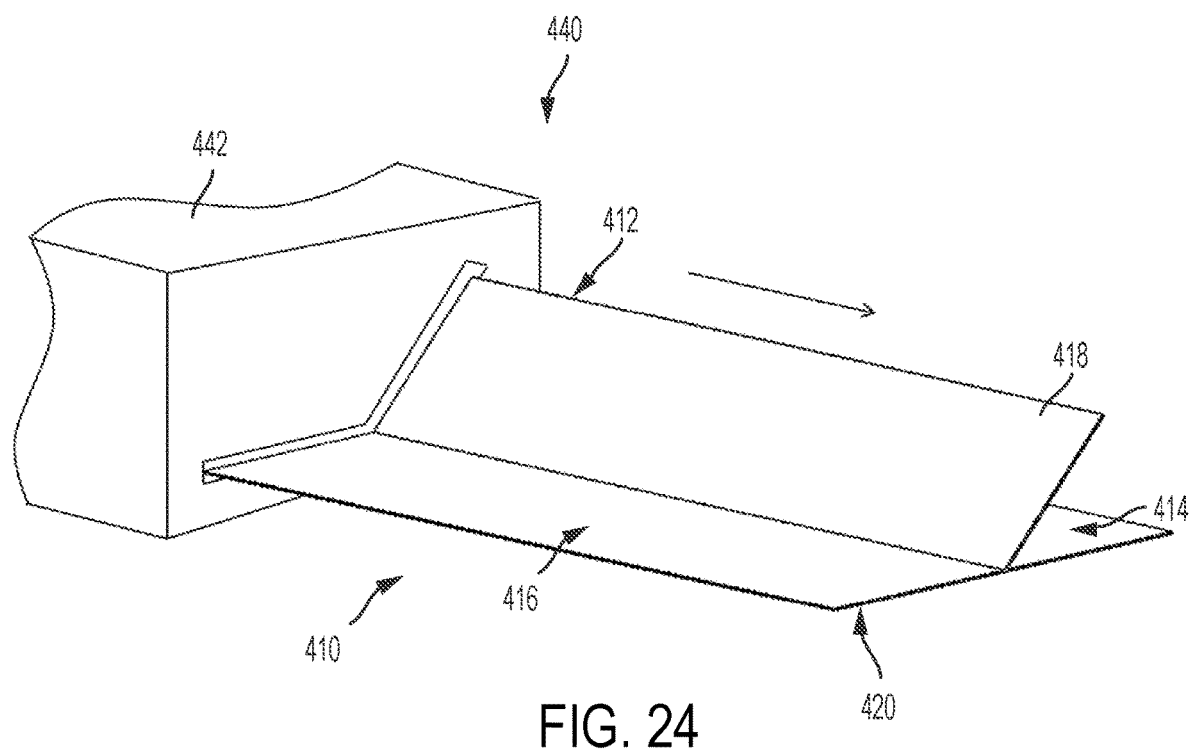
FIG. 24 is a schematic of a manufacturing process utilized to fabricate the masking device of FIG. 23.

FIGS. 23 and 24 illustrate a masking device 410 in accordance with another embodiment of the invention. The masking device 410 is composed via an extrusion process 440, but is otherwise similar to the masking device 10 described above with reference to FIGS. 2-10, with like components being shown with like reference numerals plus 400. Differences between the masking device 10, 410 are described below.

The masking device 410 includes three members 412, 414, 416—that together form various aspects of the masking device 410. For example, the masking device 410 includes a pull tab 418 and a base 420. The pull tab 418 is formed by the entirety of the first member 412 while the base 410 is formed by the second member 414 and the third member 416. The three members 412, 414, 416 are all integrally formed together. The base 420 defines a continuous masking surface such that the base 420 is entirely flat and is provided to contact and cover a masking area. The pull tab 418 extends upwardly from the base 420 of the masking device 410 at the intersection between the second and third members 414, 416. The pull tab 418 defines a gripping area to allow a user to grasp and maneuver the masking device 410. The base 420 includes a top surface 426 and a bottom surface 428 opposite the top surface 426. The bottom surface 428 is provided with an adhesive 467 (FIG. 25) in order to maintain contact with a masking area when the masking device 410 is applied to the masking area. The adhesion strength of the adhesive 467 is such that removal of the masking device 410 from the masking area and release liner 449 is permitted. In the illustrated embodiment, the masking device 410 is composed of a polymer material (e.g., Polyethylene Terephthalate), while in other embodiments, the masking device 110 may alternatively be composed of other materials, such as paper, cardboard, plastic etc.

The masking device 410 is fabricated in two manufacturing stages 440, 446. In the first manufacturing stage 440, the masking device 410 is formed by an extrusion process using a T-shaped extruder 442. The adhesive 467 is applied to the bottom surface 428 of the base 420 after the masking device 410 has been extruded to shape. In the second manufacturing stage 446, the masking device 410 is formed with a rotary die 448 (FIG. 15) by cutting through the member 412 to form the circular-shape of the masking device 410. Once the masking device 410 passes the rotary die 448, multiple masking devices 410 are applied to the release liner 449 (e.g., a polymer liner). The release liner 449 has a coating that allows the masking devices 410 to be easily removed for attachment to the masking area. Also, the masking device 410 can be removed from the masking area without leaving a residue. The release liner 449 provides an easy way to package the masking devices 410 for sale or use.

Thus, the invention provides, among other things, a masking device for covering a masking area.

What is claimed is:

1. A masking device for covering a masking area comprising:
   a first member including a first tab portion and a first base portion;
   a second member including a second tab portion and a second base portion;
   a pull tab including the first tab portion coupled to the second tab portion;
   a third member including a member connection surface and a masking connection surface, the member connection surface opposite the masking connection surface;
   a base including the first base portion, the second base portion, and the third member;
   a first adhesive coupling the member connection surface of the third member to the first base portion;
   the first adhesive coupling the member connection surface of the third member to the second base portion;
   a second adhesive disposed on the masking connection surface of the third member; and
   wherein the second adhesive is configured for removable attachment of the masking connection surface of the third member to the masking area.

2. The masking device of claim 1, further comprising the first adhesive coupling the first tab portion to the second tab portion.

3. The masking device of claim 1, wherein
   the first member is formed as a single integral piece,
   the second member is formed as a single integral piece, and
   the third member is formed as a single integral piece.

4. The masking device of claim 1, wherein the pull tab extends away from the base.

5. The masking device of claim 4, wherein the pull tab extends away from the base in a direction opposite the masking connection surface of the third member.

6. The masking device of claim 5, wherein
   the pull tab includes a pull tab maximum height defined by the pull tab in a position perpendicular to the first base portion and the second base portion,
   the base includes a base width, and
   the pull tab maximum height is shorter than the base width.

7. The masking device of claim 1, wherein the masking connection surface of the third member is a continuous surface.

8. The masking device of claim 1, wherein the second adhesive includes a type of adhesive that is the same as the first adhesive.

9. The masking device of claim 8, wherein
   the first adhesive coupling the member connection surface of the third member to the first base portion is thicker than the second adhesive on the masking connection surface of the third member, and
   the first adhesive coupling the member connection surface of the third member to the second base portion is thicker than the second adhesive on the masking connection surface of the third member.

10. The masking device of claim 1, wherein the second adhesive includes a type of adhesive that is different from the first adhesive.

11. The masking device of claim 10, wherein the first adhesive is stronger than the second adhesive.

12. The masking device of claim 10, wherein the first adhesive has a greater peel adhesion than the second adhesive.

13. The masking device of claim 1, wherein
   a first bend in the first member is disposed between the first tab portion and the first base portion, and
   a second bend in the second member is disposed between the second tab portion and the second base portion.

14. The masking device of claim 13, wherein the pull tab is pivotable relative to the base.

15. The masking device of claim 1, wherein the first member, the second member, and the third member define a void therebetween that is substantially triangular in cross-section.

16. The masking device of claim 1, further comprising a release liner removably coupled to the masking connection surface of the third member by the second adhesive.

17. The masking device of claim 16, wherein the release liner includes a release coating.

18. The masking device of claim 1, wherein the base is substantially circular.

19. The masking device of claim 1, wherein
   the pull tab includes a pull tab thickness,
   the base includes a base thickness, and
   the pull tab thickness and the base thickness are substantially equal.

20. The masking device of claim 1, wherein the first adhesive is a silicone based adhesive.

* * * * *